Figure 1:
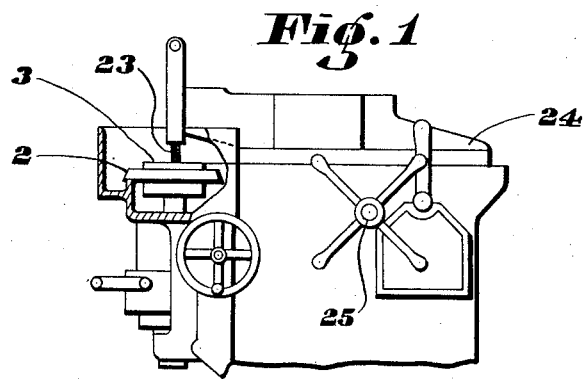

Dec. 26, 1933.    W. ARTER ET AL    1,941,381
MAGNETIC CHUCK CIRCUITS
Filed March 19, 1931

INVENTORS:
William Arter, Harry Arter
and Samuel T. Webster,
BY
their ATTORNEY.

Patented Dec. 26, 1933

1,941,381

UNITED STATES PATENT OFFICE

1,941,381

MAGNETIC CHUCK CIRCUITS

William Arter, Harry Arter and Samuel T. Webster, Worcester, Mass., assignors to Arter Grinding Machine Company, Worcester, Mass., a corporation of Massachusetts Application March 19, 1931. Serial No. 523,742

6 Claims. (Cl. 175—335)

This invention relates to magnetic chucks and to circuits for such chucks. The present application is a continuation of our pending application Serial No. 374,521, filed June 28, 1929, insofar as the subject matter common to the two applications is concerned.

Magnetic chucks are much used in automatic grinding machines and in other machine tools equipped with automatic mechanisms for placing the pieces of work in the machine and removing them therefrom. In such machines it is necessary to demagnetize the chuck at frequent intervals, particularly during the placing of the work on the chuck and the removal of it therefrom. In addition, it is also desirable to neutralize the residual magnetism, not only because it makes the work handling operations easier, but also for the reason that it reduces the wear on the work supporting face of the chuck, and more particularly because it facilitates the removal of the chips or fine metal particles from the chuck. While the operation of neutralizing the residual magnetism in a chuck is not an especially difficult matter where the factor of time is not important, it is, nevertheless, difficult to perform this operation satisfactorily by automatic means in the time interval permissible in an automatic machine working on a high production schedule.

The present invention deals especially with this problem, and it aims to devise a thoroughly satisfactory solution for it.

The nature of the invention will be readily understood from the following description when read in connection with the accompanying drawing, and the novel features will be particularly pointed out in the appended claims.

Figure 2:
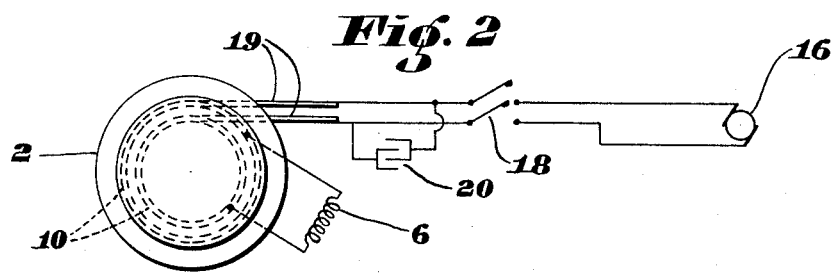
Figure 3:
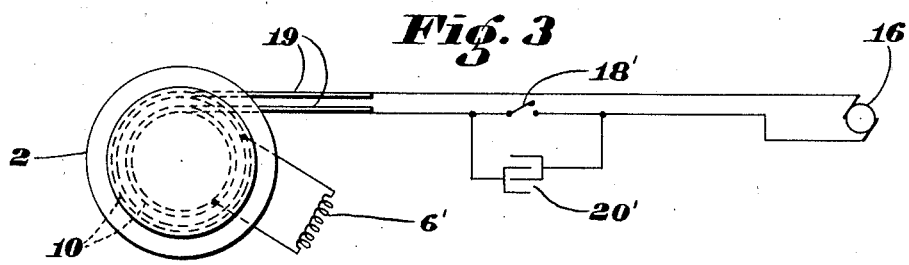
Figure 4:
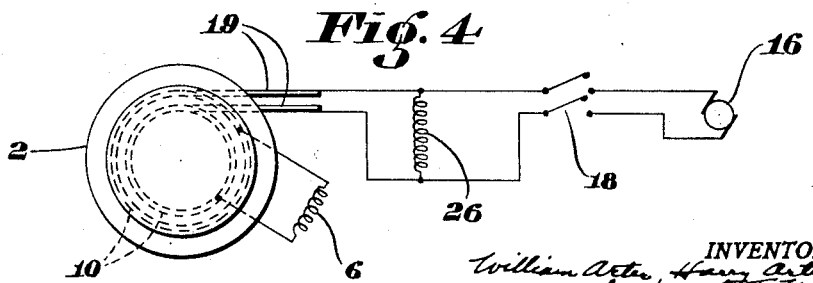

In the drawing,

Figure 1 is a side view of a part of a grinding machine equipped with a magnetic chuck with which the invention may conveniently be used; and Figs. 2, 3 and 4 are diagrammatic views illustrating different circuit arrangements for the chuck.

Referring first to Fig. 1, the grinding machine there shown includes a magnetic chuck 2 equipped with a face plate 3 on which the pieces of work are supported. The grinding wheel 23 is carried by the reciprocating wheel head 24.

The magnetizing coil for the chuck 2 is indicated diagrammatically at 6 in Figs. 2, 3 and 4. The terminals of this coil are connected, respectively, to two slip rings 10—10, both of which are supported on, but insulated from, the chuck. Brushes 19—19 bear on the respective slip rings 10—10 and are connected by suitable conductors to the terminals of some convenient source of direct current. It is a common practice to mount a direct current generator of suitable size on the machine frame or in some convenient location adjacent thereto to supply magnetizing current for the chuck, and such a generator is indicated in the drawing at 16. Any other convenient source of current may, however, be used. A switch such as that indicated at 18, Figs. 2 and 4, or 18', Fig. 3, is used in the line between the generator and the magnetizing coil to control the flow of current to the chuck coil. Preferably some arrangement, such as that shown in our earlier application above designated, is provided for opening and closing this switch automatically at the desired points in the cycle of operations of the machine to magnetize and demagnetize the chuck.

As above stated, it is desirable in using a chuck of this character in automatic machines not only to demagnetize it at the required times, but also to substantially neutralize the residual magnetism. It is further desirable to accomplish these objects automatically and in a fraction of a second. One arrangement suitable for this purpose is shown in Fig. 2. It includes a condenser 20 connected across the magnetizing circuit at a point behind the switch 18, or, in other words, between this switch and the chuck. When the switch is opened and the energizing current dies out, the magnetic field set up in the chuck by the coil 6 collapses, thus creating an inductive kick or back E. M. F. which charges the condenser 20. Immediately thereafter the condenser discharges through the coil 6 in a direction opposite to that of the flow of the magnetizing current. By selecting a condenser of a capacity suited to the size and design of the chuck, it may be made to produce a flow of demagnetizing current through the chuck of sufficient intensity to substantially neutralize the residual magnetism of the chuck without building up a reverse or opposed magnetic field. In other words, this demagnetizing current may be made just enough to buck down the residual magnetic field and kill it.

It will be evident that the condenser capacity required in any individual case will depend upon several factors, such as the size of the magnetizing coil, the nature and quantities of the metal in the chuck, peculiarities of design, and the like, as will be clear to those skilled in this art. With an eight inch chuck used in the automatic piston ring grinder put out by the assignee of this invention, we have found that a condenser having a capacity of 22 microfarads produces very satisfactory results.

A somewhat different arrangement is shown in Fig. 3 where the switch 18' is arranged to open one side only of the energizing circuit, and the condenser 20' is connected directly across this switch. This arrangement differs from that shown in Fig. 2 in that in the latter case the condenser discharge is confined to the chuck coil, whereas in the arrangement shown in Fig. 3 the condenser discharge goes through both the chuck coil and the generator 16. While it is important so to confine the condenser discharge that its energy will be utilized in demagnetizing the chuck, we have found that the impedance of the generator is so small compared to that of the chuck coil that a negligible proportion of the condenser discharge is spent in the generator.

It is contemplated that the demagnetizing current can be produced not only by using a condenser, but also by using an inductance coil in parallel with the chuck coil. Such an arrangement is shown in Fig. 4 in which an inductance coil 26 is connected across the chuck circuit in parallel with the chuck coil. When the switch 18 is opened both the coils 6 and 26 give an inductive kick, and the inductance of the coil 26 should be made enough greater than that of the coil 6 to buck down the effect of the latter and produce a flow of demagnetizing current through the chuck coil of sufficient intensity to substantially neutralize the residual magnetism. This arrangement requires a relatively large coil at 26, and for most installations we prefer to use either the arrangements shown in Figs. 2 or 3.

These circuit arrangements have the advantage of being extremely simple, entirely automatic in operation, and requiring no switch or switches other than that used for controlling the flow of magnetizing current to the chuck coil. The time required to neutralize the residual magnetism is but a fraction of a second, as will be clear to those skilled in this art. As above stated, this is a very important practical consideration for a large class of automatic machines in which magnetic chucks are used. The nature of the arrangement is such that it requires practically no attention when once adjusted.

While we have herein shown and described typical embodiments of our invention, it will be evident that the invention may be embodied in other forms without departing from the spirit or scope thereof.

Having thus described our invention, what we desire to claim as new is:

1. That improvement in methods of neutralizing the residual magnetism in a direct current magnetic chuck which consists in utilizing the collapse of the magnetic field of the chuck to charge a condenser, causing the condenser to discharge through the chuck coil in a direction opposite to the direction of flow of the magnetizing current, and producing a sufficient flow of demagnetizing current in this manner to substantially neutralize the residual magnetism of the chuck.

2. The combination with a magnetic chuck including a magnetizing coil and a direct current energizing circuit therefor, of a condenser connected in circuit with said coil and arranged to be charged upon the opening of the energizing circuit and to discharge through said coil immediately thereafter, the circuit connections being arranged to utilize the greater part of the energy of the condenser discharge in demagnetizing the chuck, and said condenser being of such capacity as to produce a current through said circuit of just enough intensity to substantially buck down and kill the residual magnetism of the chuck.

3. The combination with a magnetic chuck including a magnetizing coil, of direct current circuit connections including a switch for controlling the flow of current from a source of supply through said coil, and a condenser connected across said coil behind said switch and of such capacity as to create a discharge current through said coil, upon opening the switch, of sufficient intensity to substantially neutralize the residual magnetism of the chuck.

4. The combination with a magnetic chuck including a magnetizing coil, of direct current circuit connections including a switch for opening and closing one side of said circuit, and a condenser connected across said switch and of such capacity as to create, upon the opening of said switch, a flow of demagnetizing current through said chuck of sufficient intensity to substantially neutralize the residual magnetism of the chuck.

5. That improvement in methods of neutralizing the residual magnetism in a direct current magnetic chuck which consists in causing the collapse of the magnetic field of said chuck to produce a flow through said chuck of a de-magnetizing current, created by said collapse, and of just sufficient intensity to substantially neutralize the residual magnetism of the chuck.

6. The combination of a magnetic chuck, a direct current energizing circuit therefor, and means for causing the collapse of the magnetizing current through said circuit to produce through said chuck a flow of de-magnetizing current, created by said collapse, and of sufficient intensity to substantially neutralize the residual magnetism of the chuck.

WILLIAM ARTER.
HARRY ARTER.
SAMUEL T. WEBSTER.